W. E. WHITEHEAD & A. T. ATHERTON.

BEATERS FOR COTTON OPENERS, &c.

No. 7,159. Reissued June 6, 1876.

WITNESSES
E. McGallaher.
Lin Bacon

By

INVENTORS,
Wm E. Whitehead,
Abel T. Atherton,
J. S. Brown, their Attorney.

N. PETERS, PHOTO-LITHOGRAPHER, WASHINGTON, D. C.

UNITED STATES PATENT OFFICE.

WILLIAM E. WHITEHEAD, OF MILLS PLATTIN, ENGLAND, AND ABEL T. ATHERTON, OF LOWELL, MASSACHUSETTS.

IMPROVEMENT IN BEATERS FOR COTTON-OPENERS, &c.

Specification forming part of Letters Patent No. 159,487, dated February 2, 1875; reissue No. 7,159, dated June 6, 1876; application filed April 10, 1876.

*To all whom it may concern:*

Be it known that we, WILLIAM E. WHITEHEAD, of Mills Plattin, county of Lancaster, England, and ABEL T. ATHERTON, of Lowell, in the county of Middlesex and State of Massachusetts, have invented a certain Improvement in Machines for Opening, Cleaning, and Lapping Cotton and other fibrous materials; and we do hereby declare that the following is a full and exact description thereof, reference being had to the accompanying drawings, making part of this specification—

Figure 1:
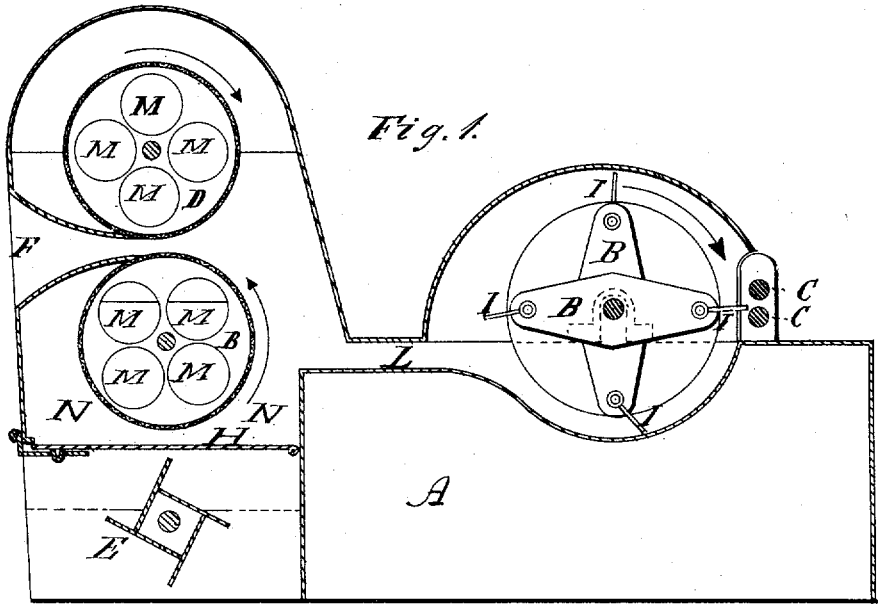
Figure 2:
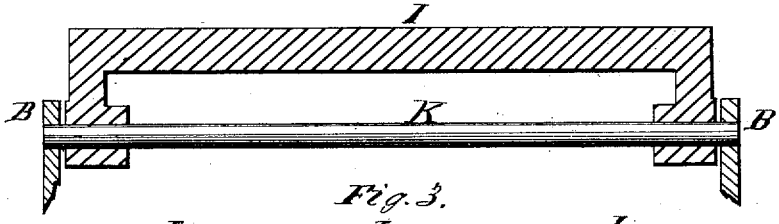
Figure 3:
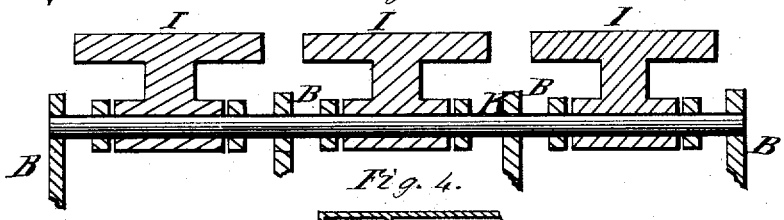
Figure 4:
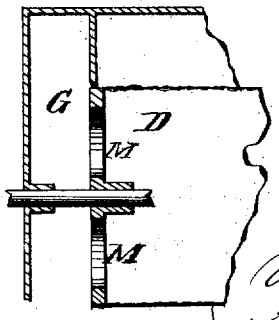

Figure 1 being a longitudinal vertical section of a cotton opening, cleaning, and lapping machine constructed with our improvement; Fig. 2, a central longitudinal section of one of the swinging beaters described in this specification; Fig. 3, a similar section of a compound swinging beater, or several beaters swinging on the same pivot-rod; Fig. 4, a section of a part detached.

Like letters designate corresponding parts in all of the figures.

The nature of our invention consists in the employment of beaters whose beating faces or edges are parallel, or nearly parallel with the feed-rolls of the machine, the said beaters being capable of yielding, to avoid obstruction or damage, when they strike matted cotton or bunches of cotton too thick to freely give way to the action of the said beaters; and in the arrangement of the said parallel-faced beaters to swing in circles at such distances from one another, and from the shaft of the reels or spiders on which they are mounted, as to be severally independent and unobstructed in their separate swinging motions and to yield back, inside of the full pathway of their revolution, when an excessive quantity of cotton is fed to them, but to act with full efficacy thereon, substantially as hereinafter specified.

In the drawings, A represents the frame of the machine; B B, the reels or spiders on which the beaters are mounted; C C, the feed-rolls; D D, the cage-cylinders; E, a draft-fan; F, an opening at the rear of the machine, through which the cotton is delivered and formed into laps; G, one of the draft air-chambers at the ends of the cage-cylinders; H, a door opening from the cage-cylinder chamber to the chamber of the draft-fan; I I, the beaters; K K, the pivot-rods on which the beaters swing; L, a passage leading from the beater-chamber to the cage-cylinder chamber; M M, openings in the ends of the cage-cylinders to form communications between the interior thereof and the draft chambers or passages G G, and N a chamber or recess below the lower cage-cylinder.

We here claim no novelty in any part of the machine except in the construction and arrangement of the beaters I I. These beaters are arranged to have their beating faces or edges extend along parallel, or nearly parallel, with the feed-rolls C C; and either single beaters on the several pivot-rods K K extend, in length, as far as the length of the feed-rolls, so as to strike the entire breadth of the cotton fed thereto, as shown in Fig. 2, or two, three, or more beaters may be mounted on each pivot-rod, as shown in Fig. 3, according to the width of the machine or the kind or condition of the material to be acted upon. In order that no obstruction to their revolution or damage to the machine or to the fibers of the cotton may result from the rapid motion of the beaters, and their necessarily very close proximity to the feed-rolls, in case matted cotton or thick bunches of the material are presented to their action by the feed-rolls, we arrange these beaters in their mountings so that they may yield backward from their work, and thus not be absolutely positive in their action; and, to allow of this yielding action, we pivot the beaters on pivot-rods K K, located at some distance from the shaft of the reels or spiders B B, on which the beaters are mounted, so that the yielding shall be inward as well as backward, and thus contract the pathway of their motion into a narrower circle, while their centrifugal motion will keep them as close out to the work as necessary to perform their proper functions well; and these pivot-rods are located near the outer ends of the reels or spiders, or sufficiently far outward from the general center of revolution to allow a distance from the shaft of the reels or spiders, and distances from one another, sufficient to enable the beaters to swing or turn on their respective rods without interfering with one another or striking the said reel or spider shaft.

The beaters swing freely on their pivots, and thus, though, when fully extended radially, they reach as close to the feed-rolls as required to act properly on the cotton, nevertheless, when bunches or any excessive quantities of cotton are presented to the beaters, they yield back from their full pathway by turning on their respective pivot-rods, so as to pass by the obstructing cotton, and no harm follows, and still the blows of the beaters on the cotton are perfectly effectual, finally resulting in a thorough separation or opening of the fibers.

The employment of two or more beaters on each pivot-rod, as shown in Fig. 3, allows a part of the beating-surfaces to yield separately, without retarding the whole, and consequently less weight of separate beaters is thus affected at one time.

The beaters are made of metal, as necessary to withstand the powerful blows and tendency to rapid wear produced thereby.

What we claim as our invention, and desire to secure by Letters Patent, is—

1. In a machine for opening and cleaning cotton and other fibrous material, beaters I I, in combination with the feed-rolls of the machine, the said beaters being constructed and arranged with their beating faces or edges parallel, or nearly parallel, with the feed-rolls, and adapted to yield to bunches or excessive quantities of the material fed thereto, for the purpose of avoiding obstruction or damage, substantially as herein specified.

2. In a machine for opening and cleaning cotton and other fibrous material, beaters I I, in combination with the feed-rolls of the machine, the said beaters being constructed and arranged with their beating faces or edges parallel, or nearly parallel, with the feed-rolls, and adapted to swing or turn in circles, on pivots or axes, at such distances from one another and from the shaft of the reels or spiders on which they are mounted as to be severally independent and unobstructed in their separate swinging motions, and yield inside of the full pathway of their revolution when bunches or an excessive quantity of cotton are fed to them, substantially as and for the purpose herein specified.

WILLIAM ED. WHITEHEAD.
ABEL T. ATHERTON.

Witnesses:
JOB W. DUPEE,
WINSLOW F. STONE.